United States Patent
Egglhuber

[11] Patent Number: 6,098,610
[45] Date of Patent: Aug. 8, 2000

[54] WIRE SAW AND METHOD OF USING IT

[75] Inventor: Karl Egglhuber, Hebertsfelden, Germany

[73] Assignee: Wacker Siltronic Gesellschaft für Halbleitermaterialien AG, Munich, Germany

[21] Appl. No.: 09/109,623

[22] Filed: Jul. 2, 1998

[30] Foreign Application Priority Data

Jul. 10, 1997 [DE] Germany .......................... 197 29 578

[51] Int. Cl.⁷ .................................................. B24B 49/00
[52] U.S. Cl. ...................... 125/21; 125/16.01; 125/16.02
[58] Field of Search ............................. 125/16.01, 16.02, 125/21; 83/165.1

[56] References Cited

U.S. PATENT DOCUMENTS

| | | | |
|---|---|---|---|
| 3,155,087 | 11/1964 | Dreyfus ....................................... | 125/21 |
| 4,160,439 | 7/1979 | Piat ........................................ | 125/21 X |
| 5,269,285 | 12/1993 | Toyama et al. ................... | 125/16.02 X |
| 5,616,065 | 4/1997 | Egglhuber ......................... | 125/16.02 X |
| 5,771,876 | 6/1998 | Egglhuber ................................. | 125/21 |

FOREIGN PATENT DOCUMENTS

0733429  3/1996  European Pat. Off. .

*Primary Examiner*—David A. Scherbel
*Assistant Examiner*—Anthony Ojini
*Attorney, Agent, or Firm*—Collard & Roe, P.C.

[57] ABSTRACT

A wire saw has rotatably mounted two or more wire-guide rollers, around which a sawing wire is wound, two adjacent wire-guide rollers forming the boundary of a wire web, which has a certain width. The wire saw has at least one drive, by means of which the wire-guide rollers are caused to rotate. The wire-guide roller, which forms a boundary of the wire web, is supported on an elongated support which is connected at one end to a machine frame and has an opposite, freely suspended end. There is also a method which can be carried out with the wire saw. The wire saw has the support passed through the wire-guide roller in its longitudinal direction and forms a fixed unit with the machine frame. A wire-guide roller forming a boundary for the wire web is designed as a sleeve which sits on a support roller. Allocated to the wire-guide roller is at least one thrust bearing so that an axial center of the wire-guide roller is not displaced or is only slightly displaced during an axial thermal expansion of the wire-guide roller as a result of overheating.

10 Claims, 7 Drawing Sheets

WIRE SAW AND METHOD OF USING IT

BACKGROUND OF THE INVENTION

1. Field of the Invention

The invention relates to cutting off a multiplicity of wafers from a workpiece with a wire saw, and in particular to the wire saw as well as to improved methods which can be carried out with the wire saw.

2. The Prior Art

Wire saws are used in particular to cut off a multiplicity of semiconductor wafers from a cylindrical crystal in one working step. A sawing wire, which is wound around two or more rotatably mounted wire-guide rollers, forms wire webs, of which at least one can be used to cut off wafers. The wire web is bounded by two wire-guide rollers, the longitudinal axes of the wire-guide rollers being oriented perpendicularly to the sawing wire in the wire webs. The wire-guide rollers of a wire saw are set in rotation by at least one drive means. During the cutting-off operation, a relative movement is produced between crystal and wire web by means of a feed device. During this cutting procedure, the crystal passes through the wire web. In the process, a suspension designated as "slurry" and containing cutting abrasive particles is fed to the wire web. However, the sawing wire may also be covered with firmly bonded cutting abrasive particles. On this basis, the suspended cutting abrasive particles can be dispensed with and, if need be, a liquid cooling lubricant can to be supplied.

The greatest precision possible is required to cut off semiconductor wafers from a crystal. A cut-off semiconductor wafer should have sides which are as flat and as parallel to one another as possible. Alternatively, the wafer can have another, particular shape. Deviations from the desired wafer shape result whenever the sawing wire in the wire web leaves a desired position during the cutting-off operation. This may be caused, for example, by movement of the feed device or movement of the crystal or movement of at least one wire-guide roller forming a boundary of the wire web. This will occur provided these movements have components which are directed in the longitudinal direction of the wire-guide rollers. Despite extensive measures for cooling the wire-guide rollers and their bearings, it may not be possible to completely avoid such axial movements of the wire-guide rollers. These axial movements are caused by thermal expansion of the wire-guide rollers as a result of overheating, which may result in an undesirable and incorrect positioning of the sawing wire in the wire web.

EP 733 429 discloses how undesirable axial movements of the wire-guide rollers or of the feed device can be measured and corrected. However, these proposals are not suitable for favorably influencing the axial thermal expansion of a wire-guide roller caused by overheating. This prior art problem is solved by the present invention.

The necessity for changing wire-guide rollers of known wire saws is complicated and involves lengthy down times during which the wire saw cannot be used. A reason is that the wire-guide rollers are very heavy and, therefore, are difficult to manipulate. The removal of a wire-guide roller is complicated, since it also requires the removal of a moveble bearing or other machine parts which are in the way. Also, this removal takes a great deal of time. An advantage of the present invention is that changing the wire-guide rollers is substantially simpler.

SUMMARY OF THE INVENTION

The present invention is directed to a wire saw for cutting off a multiplicity of wafers from a workpiece, having rotatably mounted wire-guide rollers, around which a sawing wire is wound. The two adjacent wire-guide rollers form the boundary of a wire web which has a certain width. The wire saw has at least one drive means for rotating the wire-.guide rollers. There is a wire-guide roller which forms a boundary of the wire web, and which is supported on an elongated support which is connected at one end to a machine frame and has an opposite, freely suspended end. The support is passed through the wire-guide roller in its longitudinal direction, and forms a fixed unit with the machine frame. A wire-guide roller bounding the wire web is designed as a sleeve, which sits on a support roller. The wire-guide roller includes at least one thrust bearing to ensure that the axial center of the wire-guide roller is not displaced, or is only slightly displaced, if the wire-guide roller expands as a result of overheating.

The wire-guide rollers of known wire saws are, as a rule, axially mounted with a fixed and a movable bearing. The distance by which the sawing wire in the wire web is axially displaced during thermally induced expansion of a wire-guide roller is as follows. The greater the distance of the sawing wire from the fixed bearing, the greater is the increase in the wire length due to thermal expansion. This expansion distance may be greater than the length of a wire-guide roller. The flatness and parallelism of the sides of a semiconductor wafer therefore deviate greatly from a desired value if the wire-guide rollers of the wire web have axially expanded thermally. This is due to overheating during the cutting-off procedure and is also caused if the location at which the semiconductor wafers have been produced is comparatively far away from the fixed bearing.

For the wire saw of the invention, a thermally induced expansion of the wire-guide rollers forming the boundary of the wire group leads to substantially fewer incorrect positions of the sawing wire in the wire web to the thru st bearings. The wire-guide rollers expand from a location which is at the axial center or not far away from it. The distance of the sawing wire in the wire web group from the axial center is not greater than half the length of a wire-guide roller.

In addition, a wire-guide roller of the wire saw is designed as a sleeve which sits on a support roller. The bearing arrangement of the wire-guide roller results in simplification and time-saving when the wire-guide roller is changed. Simplification results because the sleeve is substantially lighter than a conventional wire-guide roller and is therefore simpler to operate. Down time is minimized when the wire-guide roller is changed because the previously necessary and time-consuming removal of a movable bearing is no longer required. Also, the removal of other machine parts which are difficult to remove is no longer required. The installation of a wire-guide roller is also correspondingly simpler.

The present invention is also directed to a method of changing a wire-guide roller of a wire saw, which wire-guide roller forms the boundary of a wire web and is supported on an elongated support which is connected at one end to a machine frame, and has an opposite, freely suspended end. The support is passed through the wire-guide roller in its longitudinal direction and forms a fixed unit with the machine frame. The wire-guide roller is designed as a sleeve which sits on a support roller and is fixed to the support roller by a retaining element. The retaining element is removed in order to change the wire-guide roller. The wire-guide roller is pulled axially off the support roller at the freely suspended end of the support.

In one embodiment of the invention, the thrust-bearing arrangement of a wire-guide roller comprises a thrust bearing which is an axial roller or ball bearing. This axial roller or ball bearing sits on the support and is arranged at the axial center of the wire-guide roller, or at a distance of, at most, 20% of the width of the wire web adjacent to the axial center.

In a further embodiment of the invention, the bearing arrangement of a wire-guide roller comprises two opposite thrust bearings. These bearings are hydrostatic or aerostatic thrust bearings and apply pressure to the support roller. This type of bearing arrangement prevents the axial center of the wire-guide roller from varying its position relative to the machine frame during a thermally induced axial expansion of the wire-guide roller. The thrust bearings must therefore exert the same pressure on the support roller. This is achieved because the flow rate of fluid (pressurized oil or gas) which is fed through the thrust bearings is the same in both thrust bearings. However, it is also possible to specifically vary the flow rate in such a way that it is different in both thrust bearings. A controlled axial movement of the wire-guide roller can thereby be produced during the cutting-off operation. The axial movement of the wire-guide roller can be used, for example, to obtain semiconductor wafers having curved sides.

The present invention is also directed to a method of axially moving a wire-guide roller, which forms a boundary of a wire web of a wire saw. This method comprises providing a wire-guide roller as a sleeve, which sits on a support roller, and providing two opposite thrust bearings designed as hydrostatic or aerostatic thrust bearings, applying axial pressure to the support roller by a fluid being fed at a certain flow rate through the thrust bearings, and then varying the flow rate and having the flow rate different in both thrust bearings.

According to the invention, the bearing arrangement and the construction of the wire-guide rollers and the wire saw permit the novel use of wire-guide rollers having large diameters in comparison with the workpiece. In the prior art, such wire-guide rollers were avoided due to their weight and the problems associated therewith. It has now been found that wire-guide rollers of such large diameters also offer advantages. Their use is especially advisable if the sawing wire is covered with bonded cutting abrasive particles. The cutting abrasive coating tends to splinter off if the sawing wire is bent and if the radius of curvature is small. In the case of wire-guide rollers of large diameter, there is no risk of the sawing wire being excessively curved. In addition, the wire-guide rollers forming the boundary of the wire web can lie so closely together that there is no room for the workpiece at the narrowest point between the wire-guide rollers. The V-shaped space between the wire web and the point at which the wire-guide rollers are nearest to one another is sufficient to receive the workpiece, after being divided into wafers, and after the cutting-off operation. The wire-guide rollers of known wire saws are always arranged in such a way that there is room for the workpiece at any point between the wire-guide rollers. An advantage of the inventive arrangement of the wire-guide rollers of large diameter is that the free wire length of the sawing wire in the wire web is small in comparison with previous arrangements. A comparatively short free wire length makes the wire web less sensitive to disturbances which could move the sawing wire out of the desired position.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
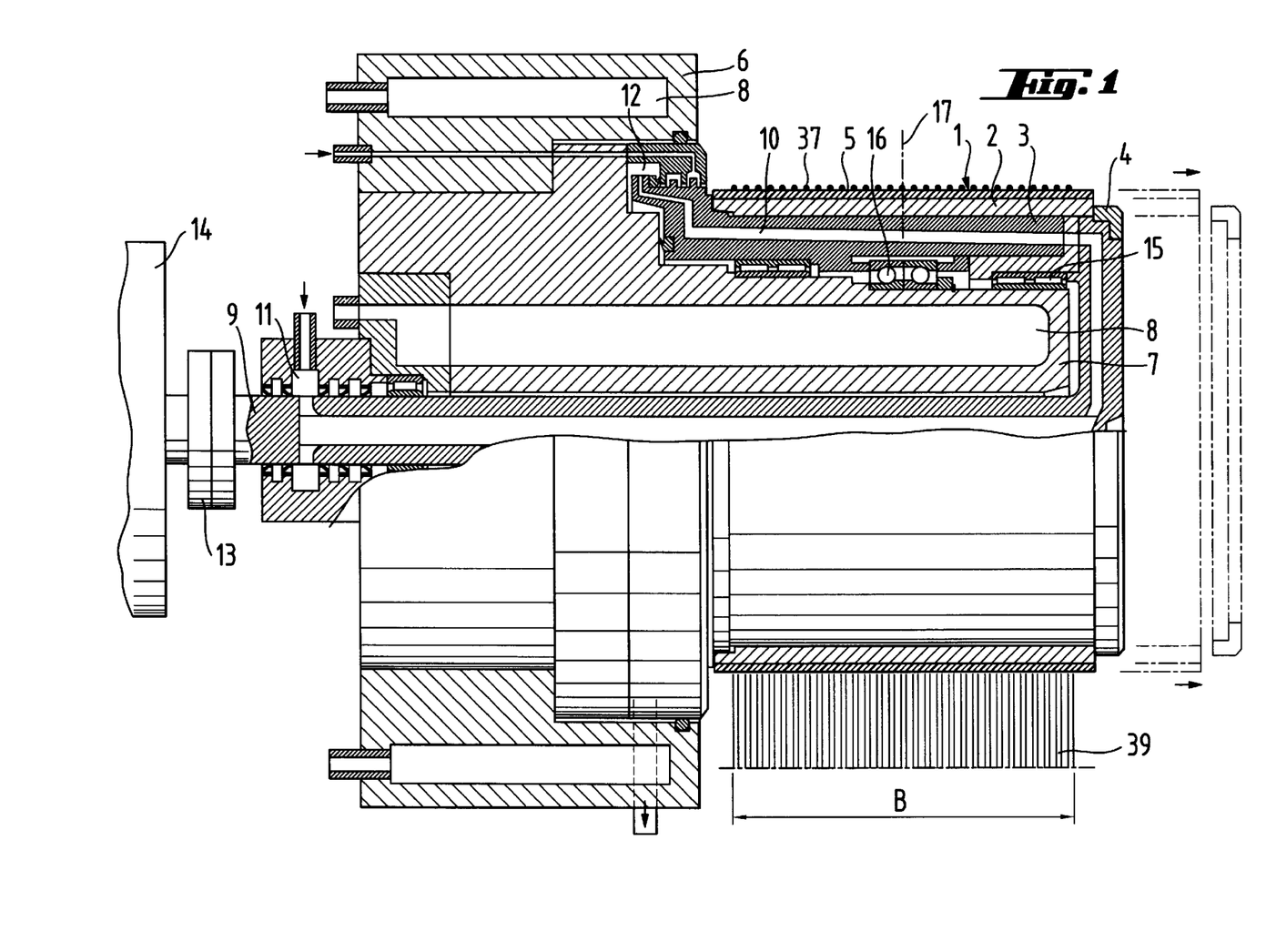
FIG. 1 shows a section view through a wire-guide roller having a thrust bearing designed as a ball bearing.

Turning now in detail to the drawings, FIG. 1 shows a wire-guide roller 1 of a wire saw, which forms the boundary of a group of wires. The wire-guide roller is designed as a sleeve 2 and sits on a support roller 3. The sleeve 2 is secured against axial displacement by a retaining device, for example a retaining ring 4. Sleeve 2 is provided with a plastic lining 5 on which the windings of the sawing wire 37 are placed. The wire web 39 has a certain width B.

Furthermore, the wire saw comprises a machine frame 6 and a support 7, which is passed through the wire-guide roller 1 in its longitudinal direction. The support 7 has a freely suspended end. At the opposite end, it is connected to the machine frame 6 and forms a fixed unit with the machine frame. When the wire-guide roller is being changed, the retaining ring 4 is removed and the wire-guide roller 1 is pulled axially off the support roller at the freely suspended end of the support. The support 7 is designed as a hollow body and accommodates and supports a drive shaft 9.

Provided in the machine frame 6 and in the support 7 are cooling passages 8 through which a temperature-regulated cooling medium circulates. In order to keep a thermally induced expansion of the wire-guide roller 1 as small as possible, a temperature-regulated cooling medium is also directed through bores 10, or chambers, in the support roller 3. The cooling medium is fed via an annular chamber 11 and through the drive shaft 9 and flows back via a collecting chamber 12 into a supply tank. The drive shaft 9 passes through the support and is coupled on one side to a motor 14 via a coupling 13 and connected on the other side to the support roller 3. The support roller 3 is set in rotation directly by the motor 14, during which the support 7 remains stationary. It is certainly preferable, but not absolutely necessary, to provide a direct drive for the support roller. However, the support roller 3 may also be driven by a driving belt which acts on the drive shaft. Radial bearings, on which the support roller can roll, are provided between the support 7 and the support roller 3. In the embodiment of FIG. 1, the radial bearings are designed as roller bearings 15.

According to the invention, there is at least one thrust bearing allocated to the wire-guide roller. This thrust bearing is to ensure that an axial center of the wire-guide roller is not displaced or is only slightly displaced during an axial thermal expansion of the wire-guide roller as a result of overheating. This axial center according to the invention is a center plane which extends perpendicularly to the longitudinal axis of the wire-guide roller and divides the roller into two halves. At least approximately the same number of windings of the sawing wire is wound around each half of the wire-guide roller.

The embodiment in FIG. 1 shows a thrust bearing which is designed as a roller bearing 16, which sits on the support 7 and is located in the axial center 17 of the wire-guide roller. Any displacement of the sawing wire in the wire web caused by overheating remains acceptably minimized as long as the roller bearing 16 is located as follows. This bearing 16 should be located in the axial center 17 or at a distance of at most 20% of the width B of the wire web adjacent to the axial center. During overheating, the wire-guide roller expands on both sides of the thrust bearing 16. The displacement of the sawing wire in the wire web during the process of the invention is up to one-half the displacement of wire saws of the prior art. If the roller bearing 16 is arranged exactly in the axial center, the position of the sawing wire in the axial center of the wire-guide roller remains unchanged even if the wire-guide roller thermally expands as a result of overheating.

Figure 2:
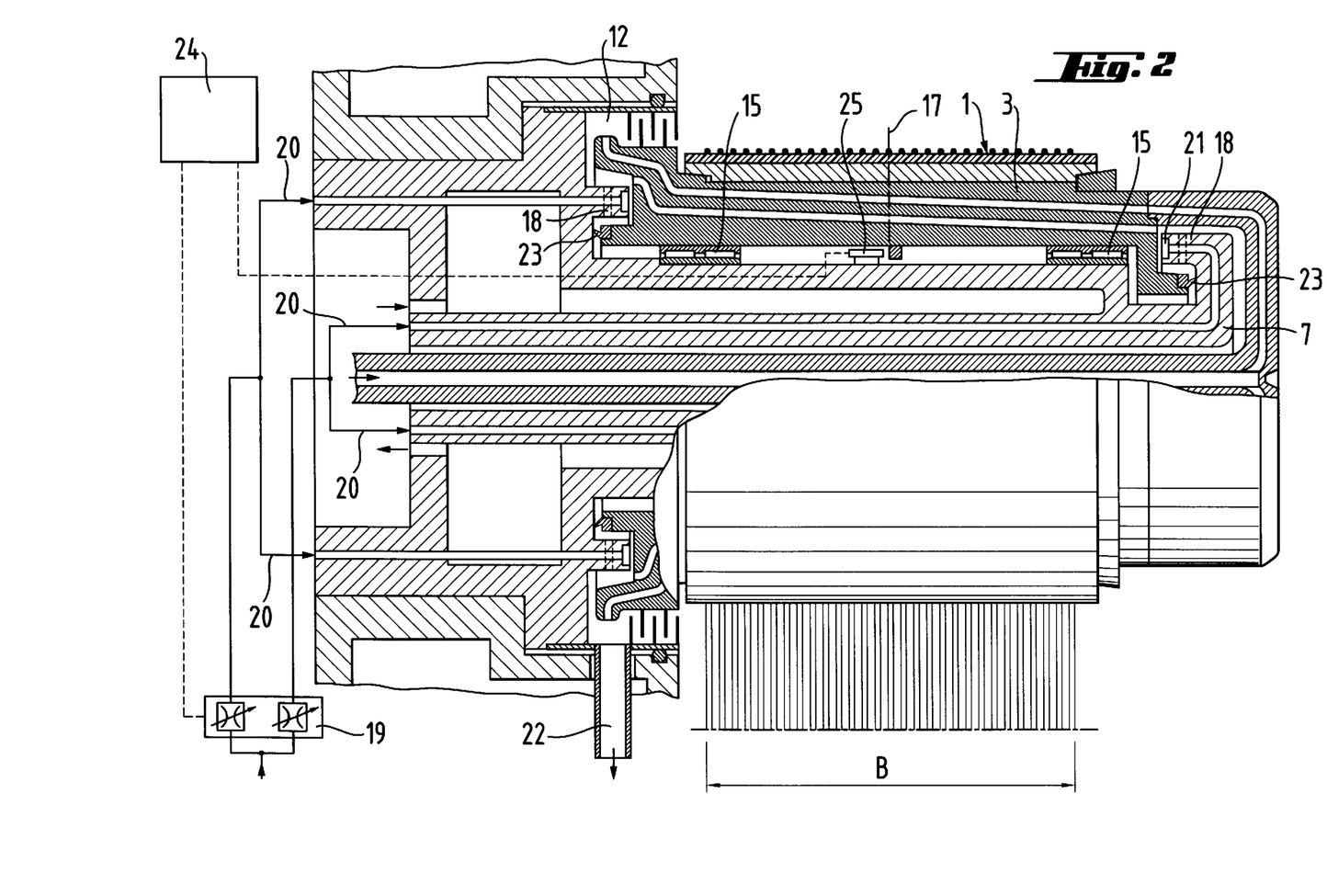
FIG. 2 shows a section view through a wire-guide roller which is axially mounted on two hydrostatic bearings.

Another embodiment is shown in FIG. 2 in which two thrust bearings are allocated to the wire-guide roller according to the invention. These thrust bearings are designed as hydrostatic thrust bearings 18, and may also be designed as aerostatic thrust bearings which apply pressure to the support roller 3 on opposite sides. By means of a pump (not shown) which delivers pressurized oil (pressurized gas in the case of an aerostatic bearing arrangement), the hydrostatic pressure of, for example, 100 bar is produced outside the bearing arrangement. This pressure is reduced by two adjustable chokes 19 to a pocket pressure of preferably 30 bar. The pressurized oil is directed through passages 20 into pockets 21 on either side of the support roller 3. This pressurized oil separates the contact surfaces between thrust bearing and support roller by a film of oil which flows out of the pockets. The film of oil is preferably less than 40 $\mu$m thick. The film of oil is less than 10 $\mu$m in the case of an aerostatic bearing arrangement. The pressurized oil which flows off is directed via further passages to a collecting chamber 12 by the rotation of the support roller 3 and is returned through a return pipe 22 to a supply tank (not shown). Means are also provided for keeping the pressurized oil at a certain temperature. In addition, it is advantageous if the pressurized oil and the temperature-regulated cooling medium do not differ chemically. Ingress of pressurized oil into the region of the radial bearings 15 is prevented by sealing elements 23. These sealing elements 23 may be dispensed with in the case of an aerostatic bearing arrangement or if hydrostatic radial bearings according to FIG. 2a are used.

If the flow rate of pressurized oil in the hydrostatic thrust bearings 18 is the same, the distance between the axial center 17 of the wire-guide roller 1 and the machine frame 6 remains unchanged, even during an axial thermal expansion of the wire-guide roller 1 caused by overheating. The displacement of the wire saw overall is substantially smaller than in known prior art wire saws.

However, it is also possible to specifically vary the flow rate in such a way that it is different in both thrust bearings. As a result, the film between the support roller and the thrust bearing becomes wider on one side of the support roller and narrower on the side of the opposite thrust bearing. Hence deliberate axial displacement of the wire-guide roller occurs. This possibility of intentionally displacing the wire-guide roller during the cutting-off operation can be utilized as follows. It is possible, for example, to manufacture semiconductor wafers, the sides of which, although parallel to one another, are curved. It may also be used to return the axial center of the wire-guide roller into a desired position if it has been found that the wire-guide roller has left the desired position. The displacement of the wire-guide roller is preferably controlled by a computer 24, which is connected to a sensor 25 and to the adjustable chokes 19 and controls the requisite flow rates by means of these valves. The sensor 25 is fastened to the support 7 and detects every axial displacement of the axial center 17 of the wire-guide roller.

Figure 2A:
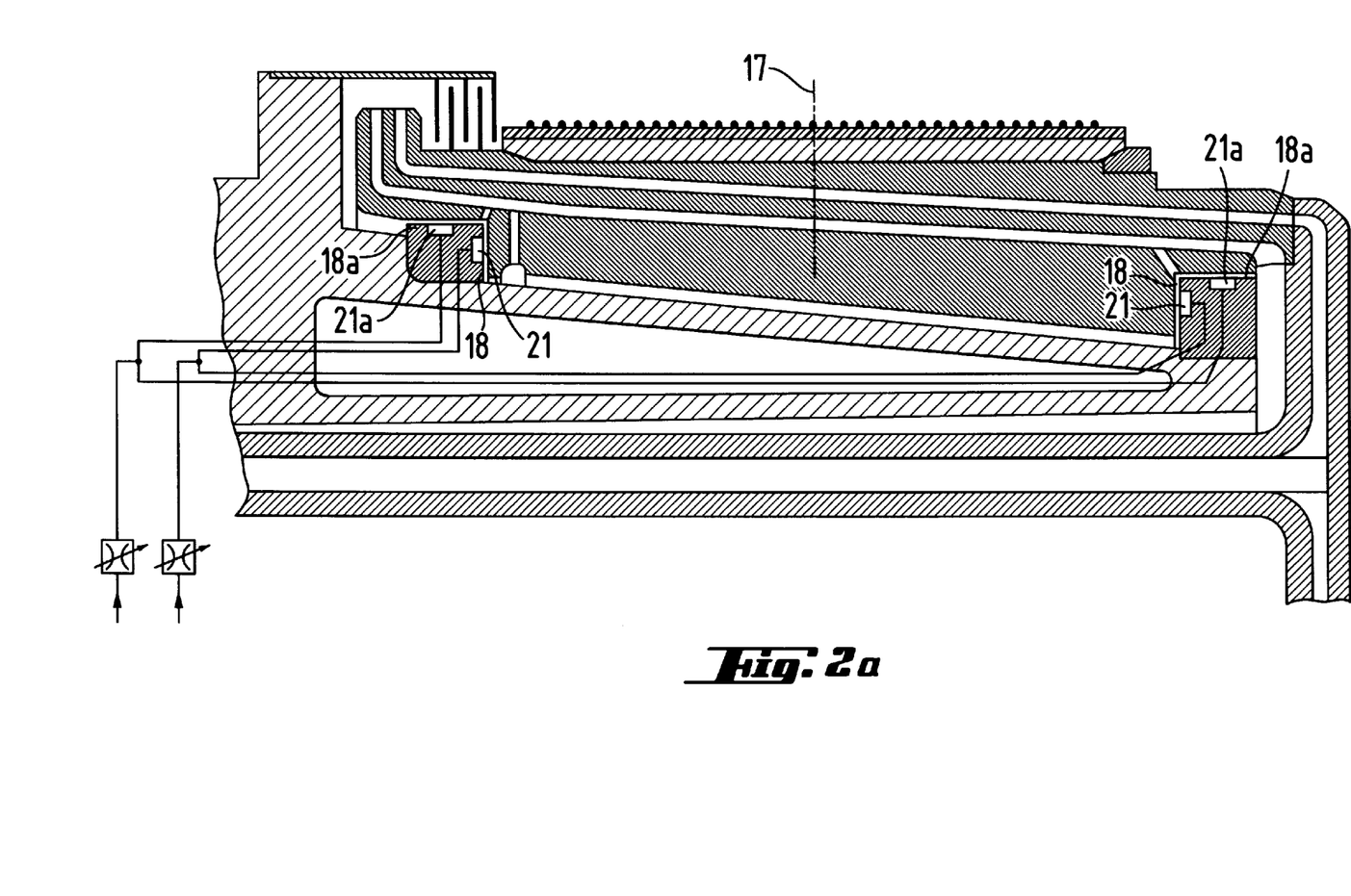
FIG. 2a shows a modified exemplary embodiment according to FIG. 2, with a hydrostatic thrust bearing and a hydrostatic radial bearing.

A modified embodiment of the invention according to FIG. 2 is shown in FIG. 2a. Instead of a radial-bearing arrangement formed by roller bearings, the radial bearings in this embodiment are designed as hydrostatic radial bearings 18a (aerostatic radial bearings are provided in a further embodiment, which is not shown). The quantity of pressurized oil which flows through the pockets 21a of the radial bearings is controlled by means of a adjustable choke 19. By this type of radial-bearing arrangement, the sawing wire can be relieved of stress if the wire saw has to be stopped temporarily, for example to perform maintenance work. In this case, it is desirable to terminate the flow of pressurized oil through the radial bearings. Due to the lack of fluid pressure, the support roller approaches the support and thereby brings about a certain stress relief of the sawing wire.

Another difference from the embodiment according to FIG. 2 is that only one choke 19 is provided in order to determine the quantity of pressurized oil which flows through the pockets 21 of the thrust bearings. Since the adjustable choke 19 always supplies both thrust bearings with the same quantity of pressurized oil, there is no possibility in this embodiment of intentionally bringing about an axial displacement of the wire-guide roller.

Figure 3:
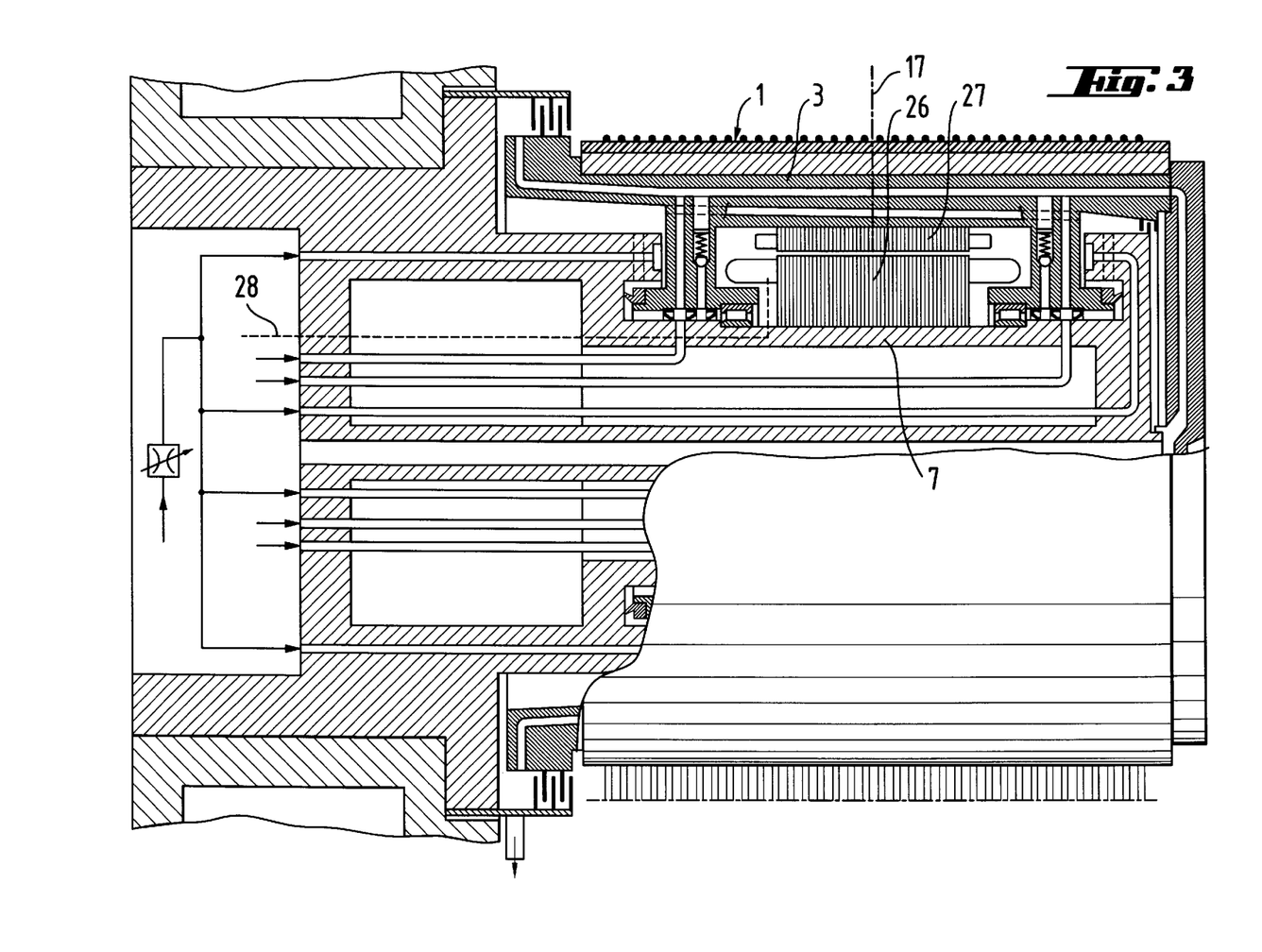
FIG. 3 shows a wire-guide roller according to FIG. 2 which is equipped with a drive accommodated in the wire-guide roller.

A further embodiment of the invention according to FIG. 2 is shown in FIG. 3. In this embodiment, too, only one adjustable choke 19 is provided for controlling the flow rate of pressurized oil through the hydrostatic thrust bearings. An essential feature is the drive of the wire-guide roller, and this drive is accommodated in the support roller. The wire-guide roller 1 is driven by an electric drive, for example an asynchronous motor. The stator 26 of the motor is mounted on the support 7 and the rotor 27 surrounding it is fastened to the support roller 3. The motor is supplied with electrical energy via a current feed 28 which runs in the support 7. Especially smooth running of the wire-guide roller can be achieved with this type of drive, since drive elements, such as couplings or driving belts, can be completely eliminated.

The use of wire saws repeatedly requires the wire-guide rollers to be changed. The reasons for a change are, for example, worn coatings or the resetting to a new pitch of the windings of the sawing wire in the wire web. A wire saw according to the present invention has wire-guide rollers which can be changed in an especially simple and time-saving manner.

Figure 4:
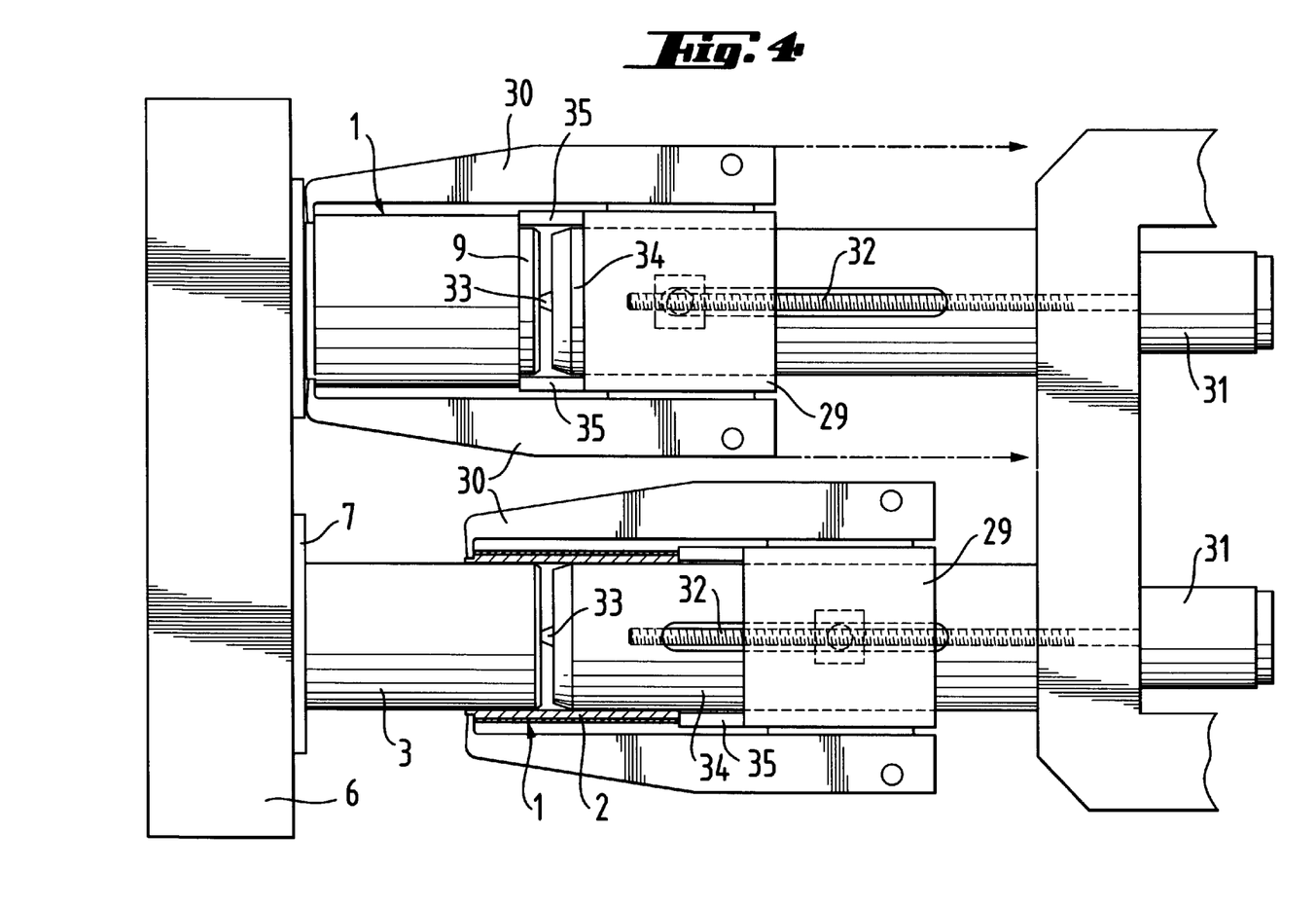
FIG. 4 shows changing adjacent wire-guide rollers by means of a tool.

The method of changing wire-guide rollers is explained in more detail below with reference to FIG. 4, which schematically shows a wire saw having two wire-guide rollers. The wire-guide rollers 1 are designed as sleeves 2, which sit on support rollers 3, and are supported on supports 7, which are anchored in the machine frame 6. To change a wire-guide roller, the wire-guide roller is pulled axially off its support roller with a tool 29. In order to do this, it is not necessary to remove any movable bearing which stands in the way. The change of the wire-guide roller requires no manipulation of the bearing arrangement or of the cooling arrangements. The tool 29 can be integrated in an automatic method of changing the wire-guide rollers. It comprises a gripping device having pivotable grips 30, which can be moved axially by means of a motor 31 and a spindle 32. In the embodiment shown, separate grips are provided for each wire-guide roller. By means of centering features 33, the gripping device docks with the drive shaft 9 or the support provided the drive is accommodated in the support roller. The grips grip behind the wire-guide roller 1 and, driven by the motor, pull the wire-guide roller 1 axially off the support roller onto a support mandrel 34. The wire-guide rollers transferred onto the support mandrels are deposited in transport containers or on trays which are held in readiness. To this end, they are pushed axially off the support mandrels by means of pressing-off devices 35. New or serviced wire-guide rollers are mounted in a similar manner to the above description, but in the reverse order. Finally, the sawing wire is wound around the mounted wire-guide rollers. However, it is likewise possible for the sawing wire to be placed on the wire-guide rollers as long as the rollers are still pulled onto the support mandrels of the tool. In this case, the wire-guide rollers are pushed together with the sawing wire onto the support rollers.

Figure 5:
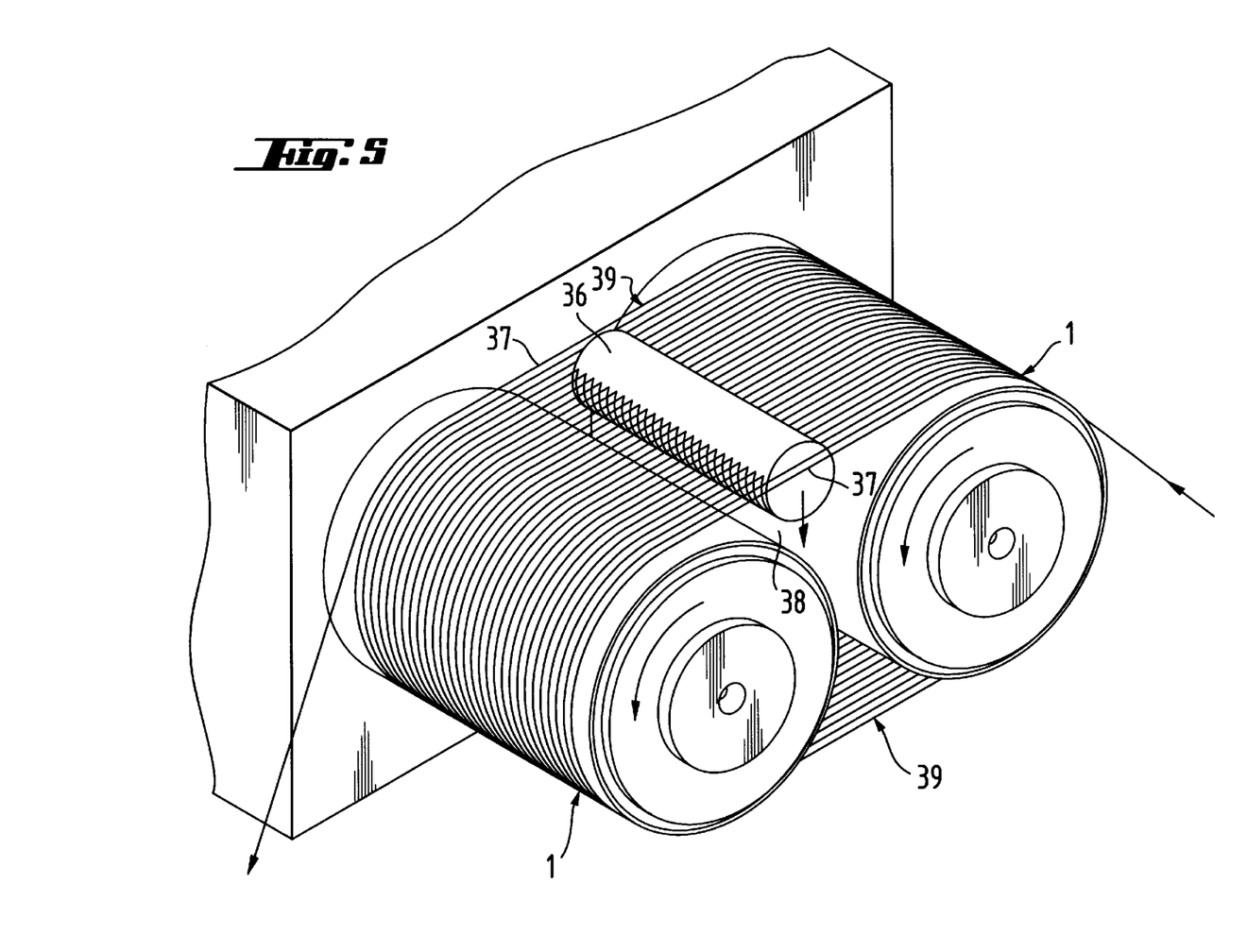
FIG. 5 shows a perspective view of a wire saw having two wire-guide rollers, the diameters of which are substantially greater than the diameter of the workpiece.

An embodiment of a wire saw according to the invention is shown in a perspective view in FIG. 5. In this wire saw, the diameter of the wire-guide rollers 1 is substantially greater than the diameter of the workpiece 36. On account of the comparatively large radii of curvature of the wire-guide rollers, the wire saw is preferably suitable for operation with a sawing wire which is covered with bonded cutting abrasive particles. Due to the large wire-guide rollers, the distance between the longitudinal axes of the wire-guide rollers can be so small that there is no room for the workpiece at the narrowest point between the wire-guide rollers. This has the advantage that the length of the sawing wire 37, stretched freely between the boundary wire-guide rollers, is close to the minimum necessary for cutting off wafers from the workpiece. The V-shaped intermediate space 38 behind the wire web 39 is sufficient to be able to receive the workpiece 36 after the workpiece passes through the wire web.

Figure 6:
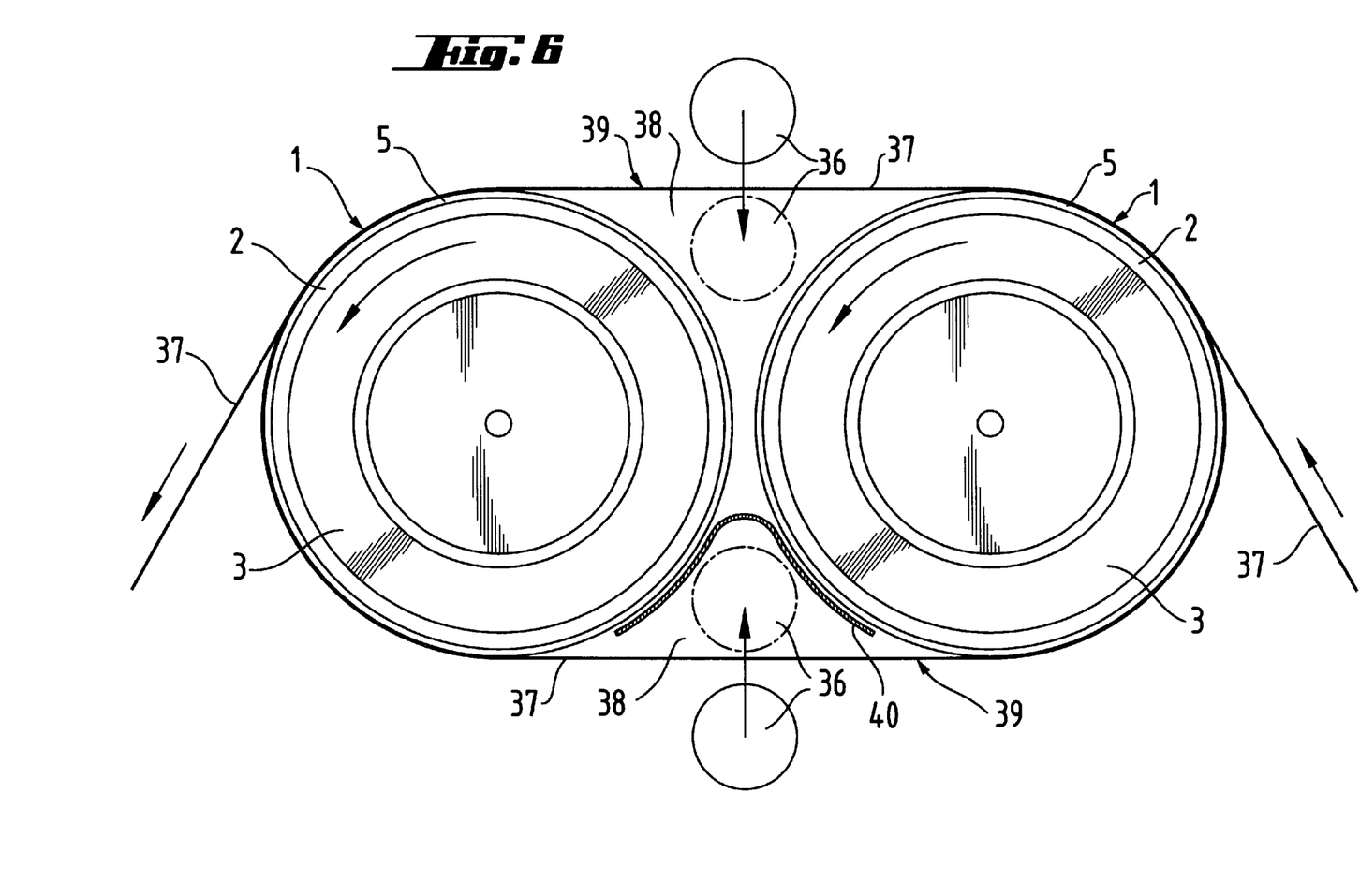
FIG. 6 shows a side view of a time-saving method of cutting off wafers with a wire saw according to FIG. 5.

The wire saw has a further wire web group 39, so that two workpieces can be divided into wafers at the same time. This is shown schematically in FIG. 6. FIG. 6 shows the wire-guide rollers 1 of the wire saw in a cross sectional view. The sawing wire 37 wound around the wire-guide rollers runs in the arrow direction from a supply reel to a take-up reel (the reels are not shown). According to the invention, the wire-guide rollers are designed as sleeves 2 which sit on a support roller 3. The sleeves have a plastic coating 5. The sawing wire lies on the coating in such a way as to be embedded in grooves. The wire-guide rollers form the boundary for the two opposite wire web webs 39. To cut off wafers, two workpieces 36 are guided simultaneously toward the wire web groups by means of a feed device (not shown). After the cutting-off operation, the workpieces, which are divided into wafers, are located in V-shaped intermediate spaces 38 behind the wire web groups. A cover 40 can be provided between the wire webs so as to protect the bottom workpiece from saw waste which is falling down.

Accordingly, while only a few embodiments of the present invention have been shown and described, it is obvious that many changes and modifications may be made thereunto without departing from the spirit and scope of the invention.

What is claimed is:

1. A wire saw having a sawing wire for cutting off a multiplicity of wafers from a workpiece and being able to compensate for axial thermal expansion, comprising at least a pair of spaced apart and adjacent support rollers;

a sleeve disposed on the surface of each support roller, said rollers and sleeves serving as wire-guide rollers around which a sawing wire is wound, forming the boundary of a group of wound sawing wires, having a defined width;

at least one drive for rotating said wire-guide rollers;

a machine frame;

an elongated support for supporting each of said wire-guide rollers, and said elongated support being connected at one end to the machine frame and having an opposite, freely suspended end, said elongated support passing through each wire-guide roller in a longitudinal direction and forming a fixed unit with the machine frame;

at least one thrust bearing to support each wire-guide roller, whereby an axial center of the wire-guide roller is not displaced during an axial thermal expansion of the wire-guide roller as a result of overheating.

2. The wire saw as claimed in claim 1, further comprising a drive shaft connected to the at least one drive and to the support roller, and being located in the elongated support.

3. The wire saw as claimed in claim 1, wherein said thrust bearing for supporting each wire-guide roller is a bearing and sits on said elongated support and is at a location selected from the group consisting of being at the axial center of the wire-guide roller and being at a distance of at most 20% of the width of the wire web adjacent to-the axial center.

4. The wire saw as claimed in claim 1, wherein two opposite thrust bearings are allocated to each wire-guide roller, said thrust bearings being selected from the group consisting of hydrostatic thrust bearings and aerostatic thrust bearings, wherein each of said thrust bearings applies axial pressure to the support roller.

5. The wire saw as claimed in claim 1, comprising radial bearings provided for mounting each of said support rollers and being selected from the group consisting of roller bearings, hydrostatic radial bearings, and aerostatic radial bearings.

6. The wire saw as claimed in claim 1, wherein the at least one drive is located in at least one of said support rollers and comprises an electric motor having a stator and a rotor, the stator being connected to the support and the rotor being connected to said support roller.

7. The wire saw as claimed in claim 1, wherein the wire-guide rollers are spaced apart a distance so that at the narrowest distance between the wire-guide rollers, said distance is smaller than the diameter of the workpiece.

8. A method of axially moving a wire-guide roller which forms the boundary of a wire web group of a wire saw comprising the steps of providing a wire-guide roller having a sleeve which sits on a support roller;

providing two opposite thrust bearings selected from the group consisting of hydrostatic thrust bearings and aerostatic thrust bearings;

applying axial pressure to the support roller by feeding a fluid at a flow rate through the thrust bearings, and by varying the flow rate of the fluid in said thrust bearings to cause axial movement of the wire-guide roller.

9. A method of changing a wire-guide roller of a wire saw, which wire-guide roller forms a boundary of a wire web comprising the steps of supporting a wire-guide roller on an elongated support, said support being connected at one end to a machine frame, said support having an opposite, freely suspended end;

passing the elongated support through the wire-guide roller in a longitudinal direction, said support being fixed to the machine frame;

said wire-guide roller having a sleeve which sits on a support roller, and fixing said wire-guide roller to the support roller by a retaining element;

removing the retaining element and changing the wire-guide roller by pulling the wire-guide roller axially off the support roller at the freely suspended end of the elongated support.

10. A wire saw having a sawing wire for cutting off a multiplicity of wafers from a workpiece and being able to compensate for axial thermal expansion, comprising at least a pair of spaced apart and adjacent support rollers;

a sleeve disposed on the surface of each support roller, said rollers and sleeves serving as wire-guide rollers around which a sawing wire is wound, forming the boundary of a group of wound sawing wires, having a defined width;

at least one drive for rotating said wire-guide rollers;

a machine frame;

an elongated support for supporting each of said wire-guide rollers, and said elongated support being connected at one end to the machine frame and having an opposite, freely suspended end, said elongated support passing through each wire-guide roller in a longitudinal direction and forming a fixed unit with the machine frame;

at least one thrust bearing to support each wire-guide roller, whereby an axial center of the wire-guide roller is only slightly displaced during an axial thermal expansion of the wire-guide roller as a result of overheating.

* * * * *